United States Patent
Gold et al.

(10) Patent No.: US 6,578,062 B1
(45) Date of Patent: Jun. 10, 2003

(54) METHOD AND CIRCUIT FOR DIGITAL DIVISION

(75) Inventors: Cliff Gold, Fremont, CA (US); John Lee, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/418,168

(22) Filed: Oct. 13, 1999

(51) Int. Cl.[7] .............................................. G06F 7/52
(52) U.S. Cl. ...................................................... 708/653
(58) Field of Search ................................. 708/650, 651, 708/652, 653, 654, 655, 656

(56) References Cited

U.S. PATENT DOCUMENTS

| 4,989,173 A | * | 1/1991 | Kaneda ........................ 708/653 |
| 5,696,713 A | * | 12/1997 | Kovacs ........................ 708/653 |
| 6,081,824 A | * | 6/2000 | Julier et al. .................. 708/653 |

* cited by examiner

Primary Examiner—Chuong Dinh Ngo

(57) ABSTRACT

A method and apparatus for calculating a quotient from a dividend and a divisor, wherein the divisor can be represented as $(2^N+2^M)$ where N is greater than M, and wherein the dividend comprises an X-bit binary number divisible by the divisor without a remainder. The values of N and M for the dividend are determined such that the divisor is equal to the value $(2^N+2^M)$. The M-th through the (N−1)-th bits of the dividend are selected as lower order bits of the quotient. The (N−1)-th and the (2N−M−1)-th bits of the dividend are examined. If the (N−1)-th bit of the dividend is "1" and if the (2N−M−1)-th bit of the dividend is "0", then one is subtracted from a value represented by the (2N−M)-th through the (X−1)-th bits of the dividend to obtain a result as higher order bits of the quotient. Otherwise, the (2N−M)-th through the (X−1)-th bits of the dividend are selected as higher order bits of the quotient. Finally, the higher order bits and the lower order bits are concatenated to obtain the quotient.

31 Claims, 8 Drawing Sheets

| $A_{20}$ | $A_{19}$ | $A_{18}$ | $A_{17}$ | $A_{16}$ | $A_{15}$ | $A_{14}$ | $A_{13}$ | $A_{12}$ | $A_{11}$ | $A_{10}$ | $A_9$ | $A_8$ | $A_7$ | $A_6$ | $A_5$ | $A_4$ | $A_3$ | $A_2$ | $A_1$ | $A_0$ |
|---|---|---|---|---|---|---|---|---|---|---|---|---|---|---|---|---|---|---|---|---|
| $S_{11}$ | $S_{10}$ | $S_9$ | $S_8$ | $S_7$ | $S_6$ | $S_5$ | $S_4$ | $S_3$ | $S_2$ | $S_1$ | $S_0$ | 0 | 0 | 0 | 0 | 0 | 0 | 0 | 0 | 0 |
| | | | | | | | $S_{11}$ | $S_{10}$ | $S_9$ | $S_8$ | $S_7$ | $S_6$ | $S_5$ | $S_4$ | $S_3$ | $S_2$ | $S_1$ | $S_0$ | 0 | 0 |

| $A_{20}$ | $A_{19}$ | $A_{18}$ | $A_{17}$ | $A_{16}$ | $A_{15}$ | $A_{14}$ | $A_{13}$ | $A_{12}$ | $A_{11}$ | $A_{10}$ | $A_9$ | $A_8$ | $A_7$ | $A_6$ | $A_5$ | $A_4$ | $A_3$ | $A_2$ | $A_1$ | $A_0$ |
|---|---|---|---|---|---|---|---|---|---|---|---|---|---|---|---|---|---|---|---|---|
| 0 | 0 | 0 | 0 | 0 | 0 | 0 | 0 | 0 | 1 | 1 | 1 | 0 | 0 | 0 | 0 | 1 | 1 | 1 | 0 | 0 |

S[11:7]     S[6:0]

| $A_{20}$ | $A_{19}$ | $A_{18}$ | $A_{17}$ | $A_{16}$ | $A_{15}$ | $A_{14}$ | $A_{13}$ | $A_{12}$ | $A_{11}$ | $A_{10}$ | $A_9$ | $A_8$ | $A_7$ | $A_6$ | $A_5$ | $A_4$ | $A_3$ | $A_2$ | $A_1$ | $A_0$ |
|---|---|---|---|---|---|---|---|---|---|---|---|---|---|---|---|---|---|---|---|---|
| 1 | 0 | 0 | 0 | 1 | 0 | 0 | 0 | 0 | 0 | 0 | 0 | 1 | 1 | 1 | 0 | 0 | 0 | 0 | 0 | 0 |

-1 
↓
S[11:7]              S[6:0]

METHOD AND CIRCUIT FOR DIGITAL DIVISION

FIELD OF THE INVENTION

The present invention relates to method and apparatus for arithmetic division, and, in particular, to method and apparatus for performing arithmetic division in digital circuits.

BACKGROUND OF THE INVENTION

Division is a time consuming arithmetic function performed by digital computers and digital circuits that require extensive circuitry. A dividend is divided by a divisor to obtain a quotient and a remainder, if any. In a first step, the divisor is subtracted from the initial dividend. Thereafter, in subsequent steps, a current dividend is obtained by shifting each bit of the previous dividend by one toward the next higher order bit of the previous dividend, leaving a vacant lowest order bit. Further, in each step, the divisor is subtracted from the higher order bits of the current dividend to obtain a partial remainder. The partial remainder and the vacant lower order bits of the initial dividend are concatenated. If the result of the subtraction is positive, then a "1" is recorded for that place of the quotient in the lowest order bit position, and a next shift and subtraction occur. If the result of the subtraction is negative, a "0" is recorded for the quotient in the lowest order bit position, and the dividend is restored to its previous condition by adding back the divisor before the next shift and subtraction. However, this process is very time consuming and requires extensive logic components for performing the above steps.

To alleviate such shortcomings, non-restoring techniques have been utilized. An N-bit dividend is divided by an N-bit divisor by performing N repeated subtractions between them by shifting registers. The dividend and the divisor are stored in corresponding registers, and a remainder register is initialized to zero. The divisor is subtracted from a number including the lower (N−1) bits of the remainder and the highest order bit of the dividend register. If the subtraction fails, a zero is stored into the lowest order bit position of the dividend register, and the dividend and the remainder registers are shifted one bit toward their highest order bit positions, such that the highest order bit of the dividend register is shifted out into the lowest order bit of the remainder register. If the subtraction is successful, a "1" is stored into the lowest order bit of the dividend register, and the dividend and the remainder registers are shifted one towards their highest order bits, and the results of the subtraction is written into the remainder register. Repeating the above subtraction by shifting steps N times provides the quotient of the division in the dividend register and the remainder of the division in the remainder register.

Although using the non-restoring method the number of steps for performing division is reduced, a logic circuit for dividing a dividend by a divisor according to such methods requires several hundred logic gates. This is because often a digital logic circuit must be designed to divide one number by another number, and the number of logic gates depends on the number of bits being divided. Such circuits are expensive to design and manufacture, consume precious circuit space, and require excessive power for operating and cooling purposes.

There is, therefore, a need for a method and apparatus which provides for dividing a dividend by a divisor using reduced circuit components and functional steps.

SUMMARY OF THE INVENTION

The present invention satisfies these needs. In one embodiment the present invention provides a method and apparatus for calculating a quotient from a dividend and a divisor. The dividend comprises an X-bit binary number divisible by the divisor without a remainder, wherein the divisor is represented as $(2^N+2^M)$ where N is greater than M. According to an embodiment of the method of the present invention, the values of N and M are determined such that the divisor is equal to the value $(2^N+2^M)$. Then, the M-th through the (N−1)-th bits of the dividend are selected as lower order bits of the quotient. To obtain the higher order bits of the quotient, the (N−1)-th and the (2N−M−1)-th bits of the dividend are examined. If the (N−1)-th bit of the dividend is "1" and if the (2N−M−1)-th bit of the dividend is "0", then the value "1" is subtracted from a value represented by the (2N−M)-th through the (X−1)-th bits of the dividend to obtain a value representing the higher order bits of the quotient. Otherwise, the (2N−M)-th through the (X−1)-th bits of the dividend are selected as higher order bits of the quotient. Finally, the higher order bits and the lower order bits are concatenated to obtain the quotient.

In an example of the method of the present invention, the dividend is stored in a dividend register having at least X bits, such that the 0-th through the (X−1)-th bits of the dividend are stored into the 0-th through the (X−1)-th bits of the dividend register, respectively. The M-th through the (N−1)-th bits of the dividend register are stored into the 0-th through the (N−M−1)-th bits of the quotient register, respectively, in parallel or by shifting. If the (N−1)-th bit of the dividend register is "1" and if the (2N−M−1)-th bit of the dividend is "0", then the value "1" is subtracted from a value represented by the (2N−M)-th through the (X−1)-th bits of the dividend register, and the result of the subtraction is stored in the (N−M)-th through the (2N−2M−3)-th bits of the quotient register, in parallel or by shifting. Otherwise, the (2N−M)-th through the (X−1)-th bits of the dividend register are stored into the (N−M)-th through the (2N−2M−3)-th bits of the quotient register, respectively, in parallel or by shifting. The quotient is represented by the 0-th through the (2N−2M−3)-th bits of the quotient register.

In another aspect, the present invention provides a digital division circuit for performing said division, wherein the dividend is stored in a dividend register. In one embodiment, the digital division circuit comprises: (a) a first circuit connected to the dividend register for providing the M-th through the (N−1)-th bits of the dividend as lower order bits of the quotient; (b) a second circuit connected to the dividend register for providing the (2N−M)-th through the (X−1)-th bits of the dividend as a first higher order bit segment for the quotient; (c) a detector connected to the dividend register for detecting the (N−1)-th and the (2N−M−1)-th bits of the dividend and for generating a control signal if: (1) the (N−1)-th bit of the dividend is "1" and (2) if the (2N−M−1)-th bit of the dividend is "0"; (d) a subtractor connected to the second circuit for subtracting the value "1" from data including the (2N−M)-th through the (X−1)-th bits of the dividend and generating output bits as a second higher order bit segment for the quotient; and (e) a selector connected to the second circuit and to the subtractor, and responsive to the control signal from the detector for selecting between the first and second higher order bit segments to provide higher order bits of the quotient, wherein: (1) in the presence of the control signal the selector provides said second higher order bit segment as the higher order bits of the quotient, otherwise, (2) in the absence of the control signal the selector provides said first higher order bit segment as the higher order bits of the quotient. The higher and lower order bits represent a value of the quotient. The digital division circuit can further comprise a quotient register for storing the quotient therein. The first circuit is connected to the dividend register and to the quotient register for storing the M-th through the (N−1)-th bits of the dividend register into the 0-th through (N−M−1)-th bits of the quotient register, respectively, as the lower order bits of the quotient. Further, the selector can comprise a multiplexer connected: (1) to the second circuit and to the subtractor, and (2) to the quotient register, for storing the second higher order bit segment into the (N−M)-th through the (2N−2M−3)-th bits of the quotient register as the higher order bits of the quotient in response to the control signal from the detector, and for storing the first higher order bit segment into the (N−M)-th through the (2N−2M−3)-th bits of the quotient register, respectively, as the higher order bits of the quotient in the absence of the control signal from the detector. As such, the quotient is represented by data including the 0-th through the (2N−2M−3)-th bits of the quotient register.

Therefore, a division circuit according to the present invention is more efficient and requires substantially fewer logic gates and operation functions than conventional division circuits for calculating a quotient from a dividend and a divisor as defined above.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

Figure 1A:
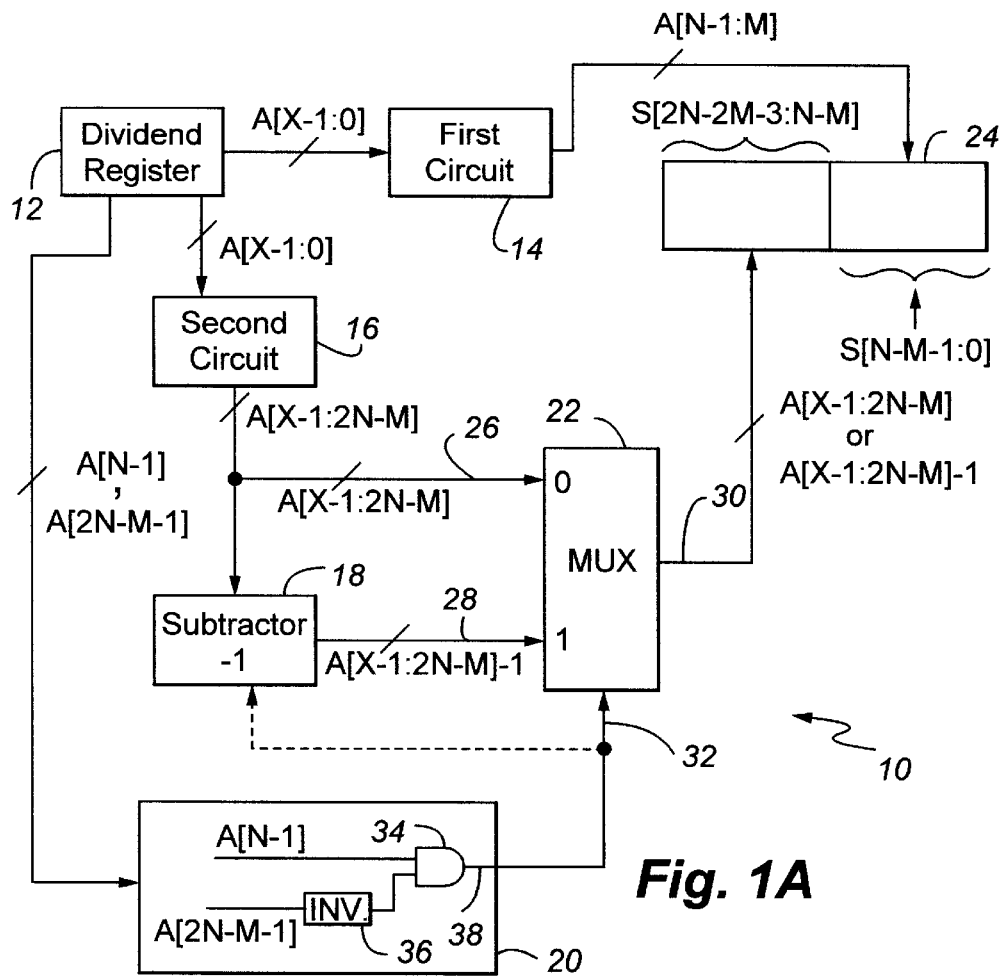
FIG. 1A shows an example block diagram of an embodiment of a digital division circuit according to the present invention.

FIG. 1A shows an example block diagram of an embodiment of a digital division circuit 10 according to an aspect of the present invention. The digital division circuit 10 is capable of calculating a quotient S from a dividend A and a divisor D, wherein the divisor D can be represented as $(2^N+2^M)$ where N is greater than M. The dividend A comprises an X-bit binary number including 0-th through (X−1)-th bits stored in a dividend register 12, and the dividend is divisible by the divisor without a remainder. The digital division circuit 10 comprises a first circuit 14 connected to the dividend register 12 for providing the M-th through the (N−1)-th bits of the dividend as lower order bits of the quotient, and a second circuit 16 connected to the dividend register 12 for providing the (2N−M)-th through the (X−1)-th bits of the dividend as a first possible higher order bit segment for the quotient depending on the values of the (N−1)-th and (2N−M−1)-th bits of the dividend as described below. A subtractor 18 is connected to the second circuit 16 for subtracting the value "1" from data including the (2N−M)-th through the (X−1)-th bits of the dividend and generating output bits as a second possible higher order bit segment for the quotient.

The digital division circuit 10 further comprises a detector 20 for detecting the (N−1)-th and the (2N−M−1)-th bits of the dividend in the dividend register 12 and for generating a control signal if: (1) the (N−1)-th bit of the dividend is "1" and (2) the (2N−M−1)-th bit of the dividend is "0". A selector 22 is connected to the second circuit 16 and to the subtractor 18, and is responsive to the control signal from the detector 20 for selecting between the first and second higher order bit segments as higher order bits of the quotient. In response to the control signal from the detector 20, the selector 22 provides the second higher order bit segment from the subtractor 18 as the higher order bits for the quotient. In the absence of the control signal, the selector 22 provides the first higher order bit segment as the higher order bits for the quotient. The higher and lower order bits represent a value of the quotient.

Preferably, the dividend register 12 includes at least X bits in length for storing the 0-th through the (X−1)-th bits of the dividend in the 0-th through the (X−1)-th bits of the dividend register 12, respectively. The value X can be equal to the value (3N−2M−2). The division circuit 10 further comprises a quotient register 24, wherein the first circuit 14 is connected to the dividend register 12 and to the quotient register 24 for storing the M-th through the (N−1)-th bits of the dividend in the dividend register 12 into the 0-th through (N−M−1)-th bits of the quotient register 24, respectively, as the lower order bits of the quotient. Preferably, the quotient register 24 includes at least (2N−2M−2) bits in length.

The selector 22 comprises a multiplexer MUX having first and second data inputs 26, 28, respectively, and a data output 30. The second circuit 16 and the subtractor 18 are connected to the first and second data inputs 26, 28 of the MUX 22, respectively, and the output 30 of the MUX 22 is connected to the quotient register 24. The MUX 22 further includes a control input 32 wherein the control signal from the detector 20 is coupled to the control input 32 of the MUX 22. In response to the control signal, the MUX 22 selects input from the subtractor 18 for storing the second higher order bit segment into the (N−M)-th through the (2N−2M−3)-th bits of the quotient register 24 as the higher order bits of the quotient. Otherwise, in the absence of the control signal, the MUX 22 selects input from the second circuit 16 to store the first higher order bit segment into the (N−M)-th through the (2N−2M−3)-th bits of the quotient register 24, respectively, as the higher order bits of the quotient. Whereby, the quotient is represented by data including the 0-th through the (2N−2M−3)-th bits of the quotient register 24.

The detector 20 comprises a logic circuit for generating said control signal if the (N−1)-th bit of the dividend is "1" and if the (2N−M−1)-th bit of the dividend is "0". In one embodiment, the detector 20 comprises an AND gate 34 having the (N−1)-th bit of the dividend in the dividend register 12 as one input, and the (2N−M−1)-th bit of the dividend in the dividend register 12, inverted by an inverter 36, as a second input. The AND gate 34 has an output 38 connected to the control input 32 of the MUX 22. When the (N−1)-th bit of the dividend is "1" and the (2N−M−1)-th bit of the dividend is "0", the output of the AND gate 34 is high, representing said control signal. Otherwise, the output of the AND gate 34 is low indicating absence of said control signal.

Figure 1B:
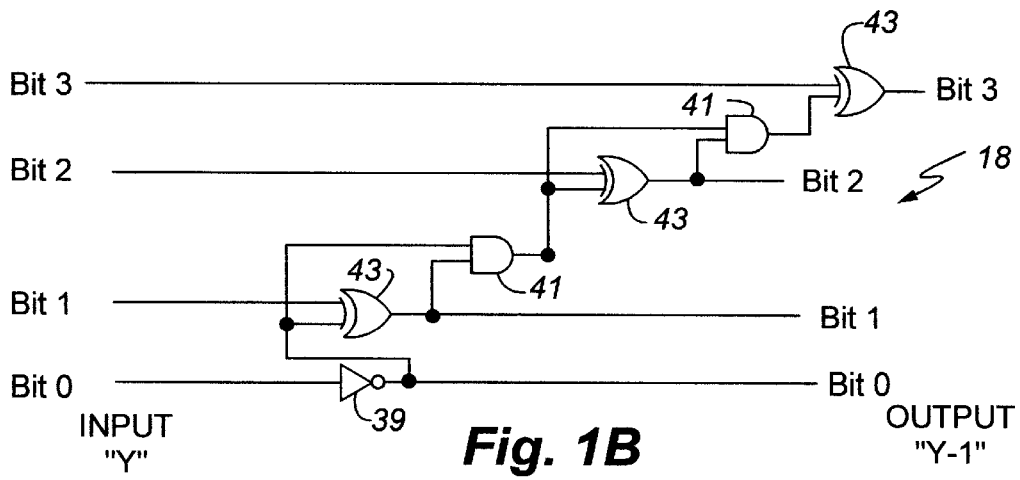
FIG. 1B shows an example logic diagram of an embodiment of the subtractor of FIG. 1A.

The subtractor 18 can be responsive to the control signal from the detector 20 such that the subtractor 18 performs the subtraction only in response to the control signal. Referring to FIG. 1B, the subtractor 18 can comprise a decrementor which decrements an input value by the value "1" to generate an output value. The example subtractor 18 in FIG. 1B comprises a 4-bit decrementor including an inverter 39, two AND gates 41 and three XOR gates 43 interconnected as shown. An input value Y having input bits 0, 1, 2 and 3 is decremented to an output value (Y−1) having output bits 0, 1, 2 and 3 as shown.

Figures 2, 3, 4:
FIG. 2 shows example dividend and quotient register bit positions for a divide by 516 digital division circuit according to the present invention.
FIG. 3 shows dividend bit values for dividing an example dividend value by 516.
FIG. 4 shows dividend bit values for dividing another example dividend value by 516.

Referring to FIG. 2, in an example operation, the digital division circuit 10 divides a 21-bit binary dividend A by a divisor D having a decimal value of 516, to obtain a quotient S without a remainder. The divisor value 516 can be represented as $(2^9+2^2)$, where N=9, M=2 and X=21. The 0-th through the 20-th bits of the dividend A are designated as $A_0$ through $A_{20}$. The bit $A_0$ is the lowest order, or the least significant, bit of the dividend A, and the bit $A_{20}$ is the highest order, or the most significant, bit of the dividend A. The quotient S is a 12-bit binary number, and the 0-th through the 11-th bits of the quotient S are designated as $S_0$ through $S_{11}$. The bit $S_0$ is the lowest order, or the least significant, bit of the quotient S, and the bit $S_{11}$ is the highest order, or the most significant, bit of the quotient S. The dividend A is the product of the quotient S and the divisor value $(2^9+2^2)$, wherein $A=S*(2^9+2^2)$, and the dividend A can be represented as the sum of: (1) a first product of the quotient and the value $2^9$, and (2) a second product of the quotient and the value $2^2$, wherein $A=(S*2^9)+(S*2^2)$. In the description herein, the symbol "*" represents decimal multiplication.

The second product $(S*2^2)$ is equivalent to a binary shift of the quotient S towards the quotient's highest order bit by two as shown. Therefore, the lower order bits $S_0$ through $S_6$ of the quotient S are represented by the bits $A_2$ through $A_8$ of the dividend A, respectively, whereby S[6:0]=A[8:2]. The first product $(S*2^9)$ is equivalent to a binary shift of the quotient S towards the quotient's highest order bit by nine as shown. If the bit $A_8$ of the dividend A is "1" and the bit $A_{15}$ of the dividend A is "0", then the bits $S_7$ through $S_{11}$ of the quotient S are represented by the bits $A_{16}$ through $A_{20}$ of the dividend A, respectively, minus the value one, wherein S[11:7]=(A[20:16]−1). However, if the bit $A_8$ of the dividend A is "0" or the bit $A_{15}$ of the dividend A is "1", then the bits $S_7$ through $S_{11}$ of the quotient S are represented by the bits $A_{16}$ through $A_{20}$ of the dividend A, respectively, whereby S[11:7]=A[20:16]−1.

Referring to FIG. 3, in a numerical example, the dividend A is the decimal value 3612 and the divisor D is the decimal value 516 and the digital division circuit 10 generate a value decimal of 7 for the quotient S, without a remainder. The dividend A is represented as a 21-bit binary value 000000000111000011100, and the divisor D is represented by the value $(2^9+2^2)$. The bits $S_0$ through $S_6$ of the quotient S are represented by the bits $A_2$ through $A_8$ of the dividend A, respectively, whereby, S[6:0]=A[8:2] or 0000111 binary. Since the bit $A_8$ of the dividend A is "0" and the bit $A_{15}$ of the dividend A is "0", the bits $S_7$ through $S_{11}$ of the quotient S are represented by the bits $A_{16}$ through $A_{20}$ of the dividend A, respectively, whereby S[11:7]=A[20:16] or 00000 binary. As such, S[11:0]=000000000111 binary, representing the decimal value 7 for the quotient S.

Referring to FIG. 4, in another numerical example, the dividend A is the decimal value 1114560 and the divisor D is the decimal value 516, and the digital division circuit generate the decimal value 2160 for the quotient S, without a remainder. The dividend A is represented by the 21-bit binary value 100010000000111000000, and the divisor D is represented by the value $(2^9+2^2)$. The bits $S_0$ through $S_6$ of the quotient S are represented by the bits $A_2$ through $A_8$ of the dividend A, respectively, whereby, S[6:0]=A[8:2] or 1110000 binary. Since the bit $A_8$ of the dividend A is "1" and the bit $A_{15}$ of the dividend A is "0", the bits $S_7$ through $S_{11}$ of the quotient S are represented by the bits $A_{16}$ through $A_{20}$ of the dividend A, respectively, minus one. Since A[20:16] is 10001 binary, then S[11:7]=(A[20:16]−1) is 10000 binary. Therefore, the quotient value S[11:0]=100001110000 binary, representing the decimal value 2160 for the quotient S.

Figure 5A:
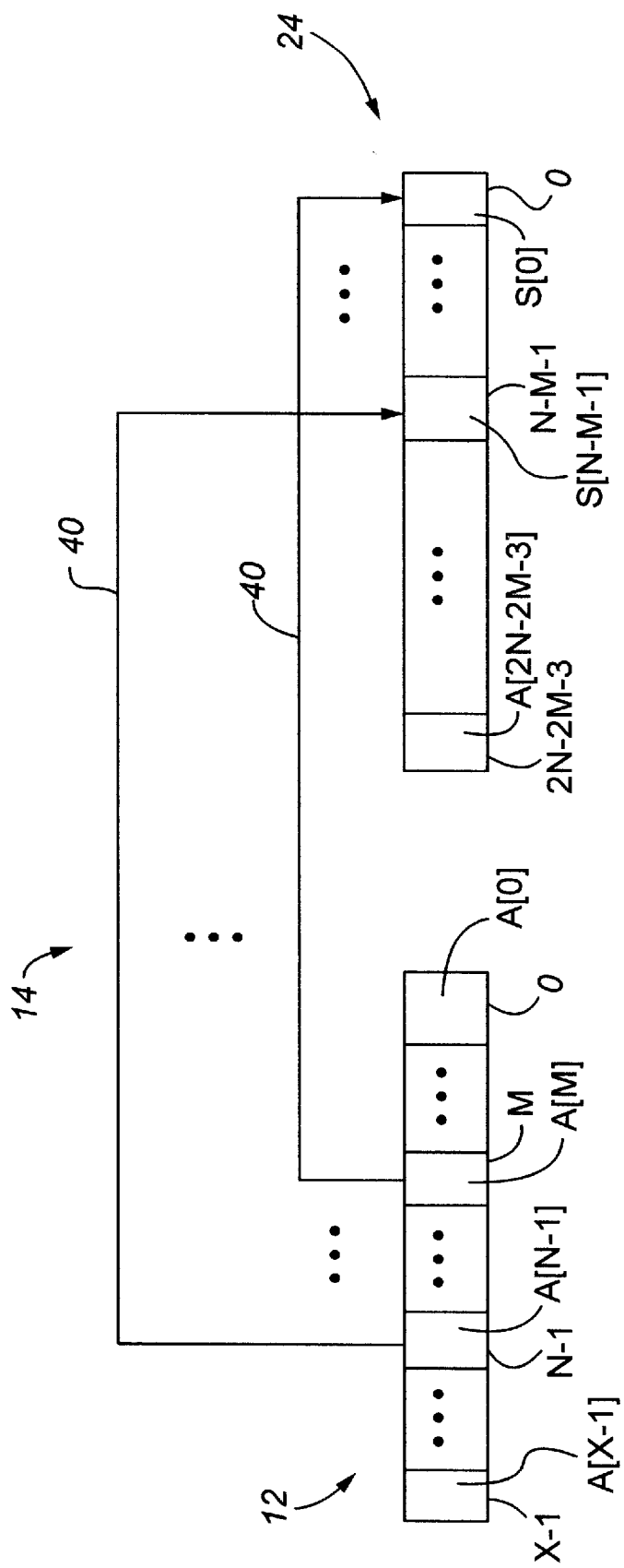
FIG. 5A shows a block diagram of an embodiment of the first circuit of FIG. 1 interconnecting the dividend and the quotient register.
Figure 5B:
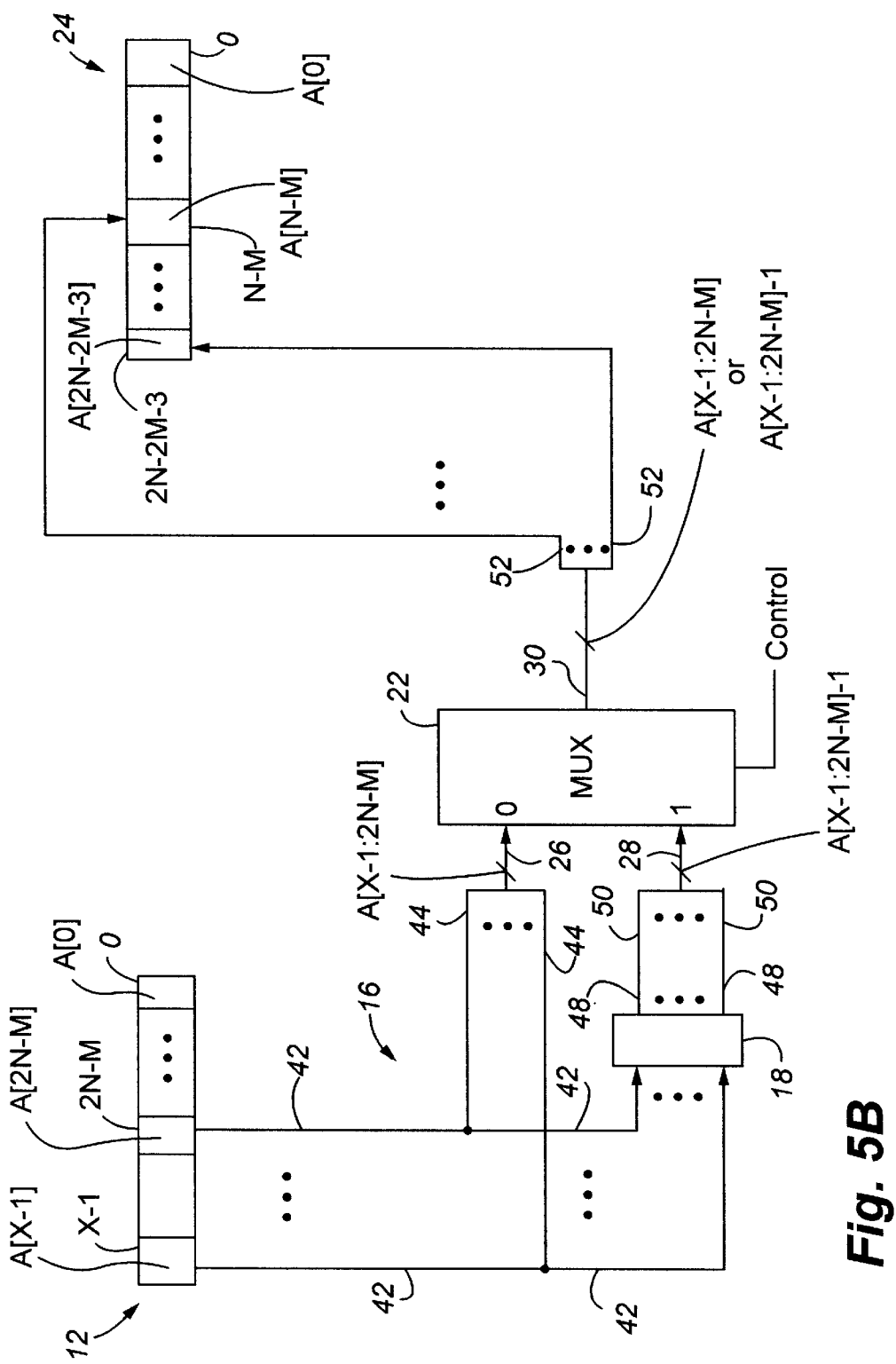
FIG. 5B shows a partial block diagram of the circuit of FIG. 1, including an embodiment of the second circuit of FIG. 1.

FIG. 5A shows a block diagram of an embodiment of the first circuit 14 of FIG. 1A interconnecting the dividend and the quotient registers 12, 24. In that embodiment, the first circuit 14 comprises (N−M) first connectors 40 for electrically connecting the M-th through the (N−1)-th bits of the dividend register 12 to the 0-th through (N−M−1)-th bits of the quotient register 24, respectively. FIG. 5B shows a partial block diagram of the division circuit 10 of FIG. 1A, including an embodiment of the second circuit 16. In that embodiment, each of the first and second data inputs 26, 28 comprises (N−M−2) bits as bit inputs to the MUX 22, and the data output 30 comprises (N−M−2) bits as bit outputs from the MUX 22. The second circuit 16 comprises (N−M−2) second connectors 42 electrically connecting the (2N−M)-th through the (X−1)-th bits of the dividend register 12 to the first data input 26 of the MUX 22. The first data input 26 of the MUX 22 includes (N−M−2) first bit inputs 44 corresponding to the second connectors 42. The second connectors 42 further electrically connect the (2N−M)-th through the (X−1)-th bits of the dividend register 12 to the subtractor 18.

The subtractor 18 can include a decrementor having (N−M−2) input bits for receiving the (2N−M)-th through the (X−1)-th bits of the dividend A, and (N−M−2) output bits for outputting a subtraction by "1" result. Referring to FIG. 5B, the subtractor 18 includes (N−M−2) bit outputs 48 for outputting the subtraction result to the second data input 28 of the MUX 22. The second data input 28 of the MUX 22 includes (N−M−2) second bit inputs 50 corresponding to the bit outputs 48 of the subtractor 18. The bit outputs 48 of the subtractor 18 are connected to the corresponding second bit inputs 50 of the MUX 22. The data output of the MUX 22 includes (N−M−2) bit outputs 52 electrically connected to the (N−M)-th through the (2N−2M−3)-th bits of the quotient register 24, respectively. Based on the control signal from the detector 20, either the (2N−M)-th through the (X−1)-th bits of the dividend in the register 12, or the subtraction result from the subtractor 18, including the value represented by the (2N−M)-th through the (X−1)-th bits of the dividend A decremented by "1", are stored in the (N−M)-th through the (2N–2M–3)-th bits of the quotient register 24. The 0-th through the (2N–2M–3)-th bits of the quotient register 24 then provide the quotient S of the division.

Figure 6:
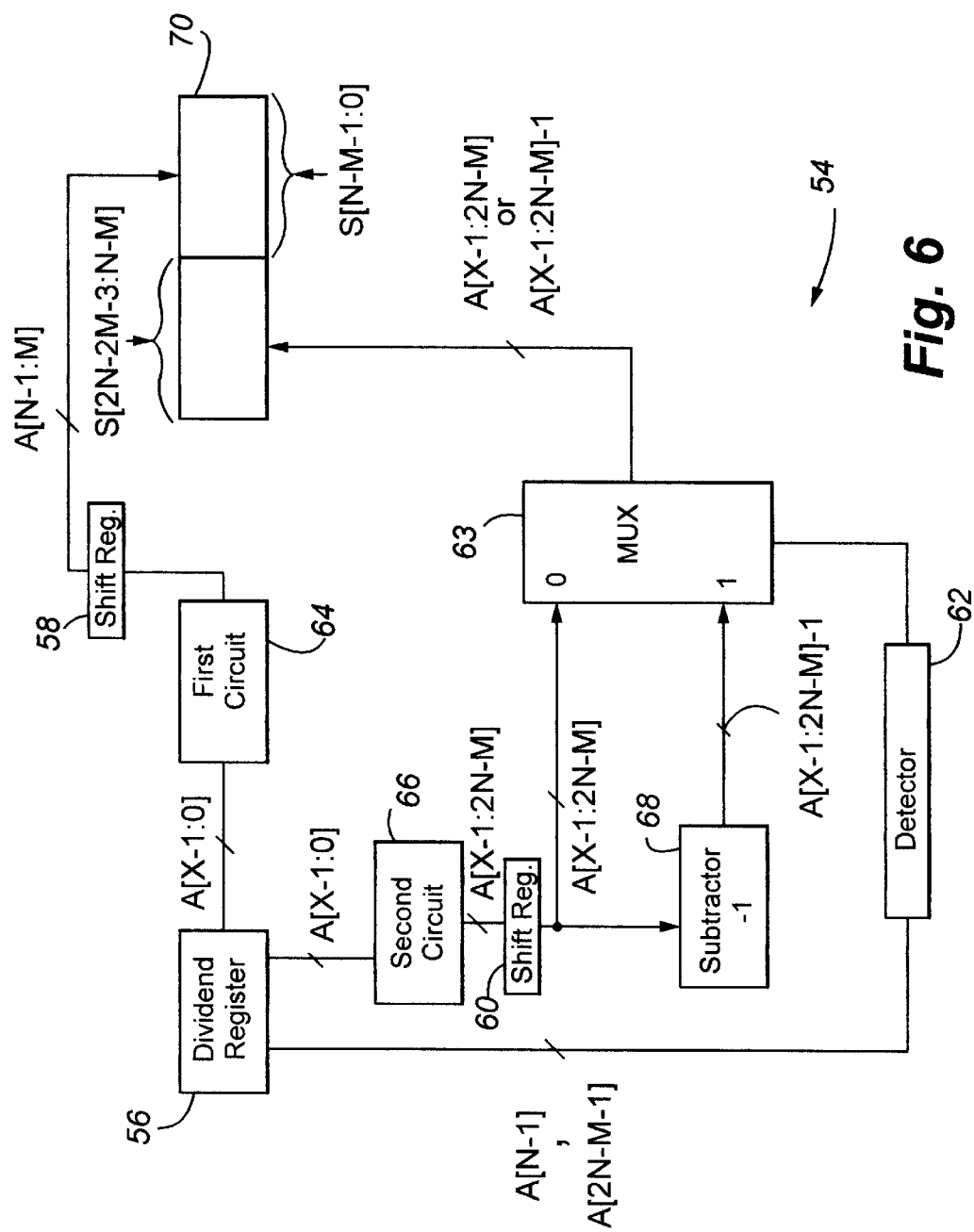
FIG. 6 shows a block diagram on another embodiment of a digital division circuit according to the present invention.

Referring to FIG. 6, in another embodiment, a digital division circuit 54 according to the present invention is shown. The digital division circuit 54 includes a dividend shift register 56 having X bits for storing the 0-th through the (X–1)-th bits of the dividend A; a first shift register 58 having a plurality of bits for storing lower order bits of the quotient S; and a second shift register 60 having a plurality of bits for storing higher order bits of the quotient S. The digital division circuit 54 further includes a detector 62 for detecting the (N–1)-th and the (2N–M–1)-th bits of the dividend in the dividend register 56 and for generating a control signal if: (1) the (N–1)-th bit of the dividend is "1" and (2) the (2N–M–1)-th bit of the dividend is "0".

The digital division circuit 54 further includes a first control circuit 64 connected to the dividend register 56 for shifting out the M-th through the (N–1)-th bits of the dividend from the dividend register 56 as lower order bits of the quotient. Preferably, the first control circuit 64 shifts out the M-th through the (N–1)-th bits of the dividend from the dividend register 56 into the 0-th through (N–M–1)-th bits of the first shift register 58, respectively. The M-th through the (N–1)-th bits of the dividend in the register 58 are stored in the 0-th through (N–M–1)-th bits of a quotient register 70. Further, the digital division circuit 54 includes a second control circuit 66 connected to the dividend register 56 for shifting out the (2N–M)-th through the (X–1)-th bits of the dividend from the dividend register 56 as a first higher order bit segment for the quotient. Preferably, the second control circuit 66 shifts out the (2N–M)-th through the (X–1)-th bits of the dividend from the dividend register 56 into the 0-th through the (N–M–1)-th bits of the second shift register 60, respectively.

A subtractor 68 is connected to the second shift register 60 for subtracting the value "1" from data including the (2N–M)-th through the (X–1)-th bits of the dividend in the second shift register 60 to generate a second higher order bit segment for the quotient. A selector 63 is connected to the second shift register 60 and to the subtractor 68, and is responsive to the control signal from the detector 62 for selecting between the first and second higher order bit segments as higher order bits of the quotient. In response to the control signal from the detector 62, the selector 63 selects and outputs the second higher order bit segment from the subtractor 68 as the higher order bits for the quotient. In the absence of the control signal, the selector 63 selects and outputs the first higher order bit segment from the register 60 as the higher order bits for the quotient. The higher order bits selected by the selector 63 are stored in the (N–M)-th through the (2N–2M–3)-th bits of the quotient register 70. The quotient register 70 includes at least (2N–2M–2) bits in length, and the quotient is represented by the 0-th through the (2N–2M–3)-th bits of the quotient register 70. The first control circuit 64 can include a first signal generator for providing shift signals to the dividend register 56 and to the first shift register 58, and can further include first electrical connection circuitry for transferring data between the registers 56, 58. Similarly, the second control circuit 66 can include a second signal generator for providing shift signals to the dividend register 56 and the second shift register 60, and can further include second electrical connection circuitry for transferring data between the registers 56, 60.

Figure 7:
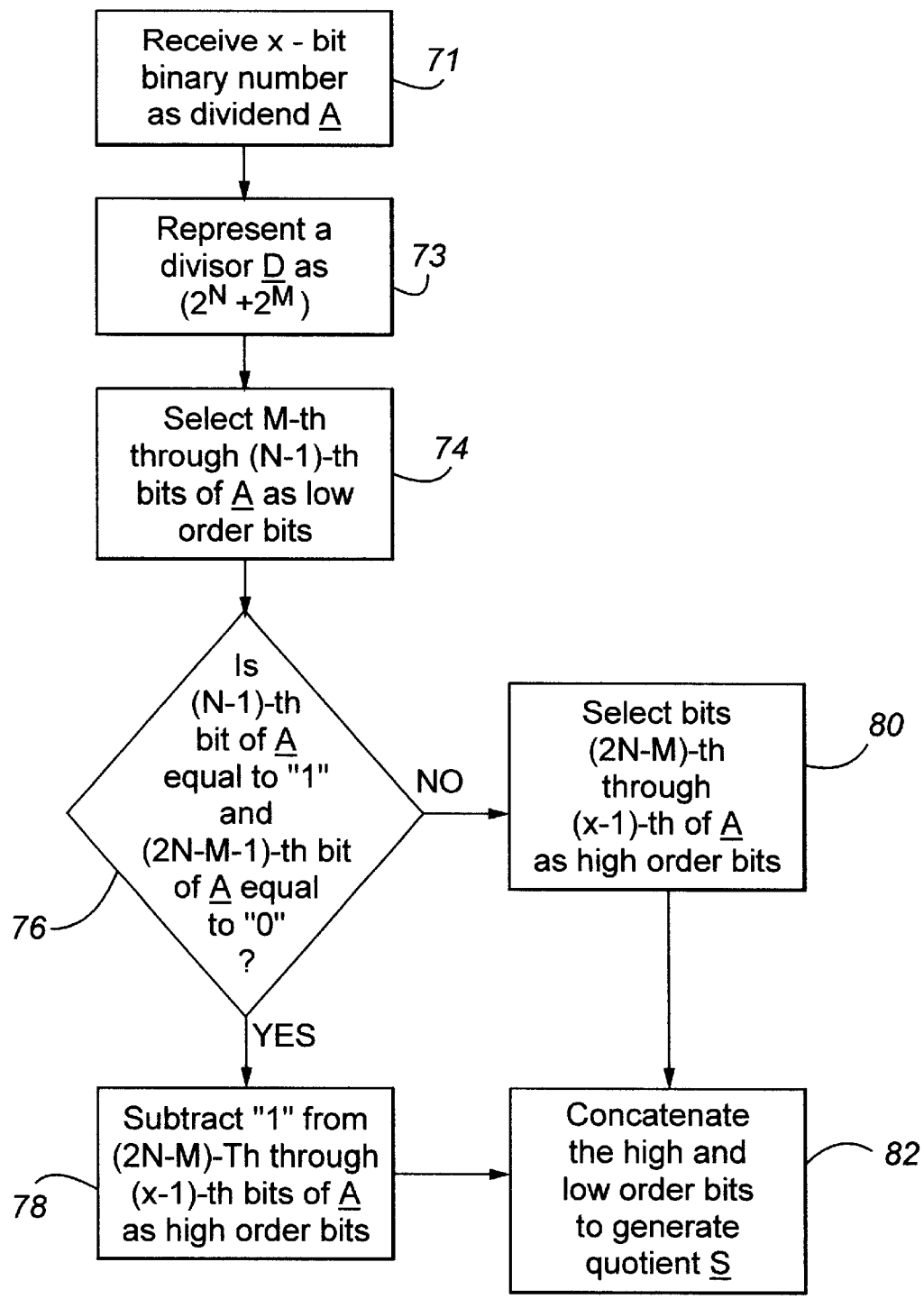
FIG. 7 shows an example flow chart of the steps of an embodiment of a division method according to another aspect of the present invention.

In another aspect, the present invention provides a method for calculating the quotient S from the dividend A and the divisor D, wherein the divisor D can be represented as $(2^N+2^M)$ where N is greater than M. The dividend A comprises an X-bit binary number divisible by the divisor D without a remainder. FIG. 7 shows an example flowchart of an embodiment of the method of the present invention including the steps of: receiving the dividend A (step 71); determining the values of M and N such that the divisor D is equal to the value $(2^N+2^M)$ (step 73); selecting the M-th through the (N–1)-th bits of the dividend A as lower order bits of the quotient (step 74); determining if the (N–1)-th bit of the dividend A is "1" and if the (2N–M–1)-th bit of the dividend A is "0" (step 76), and if so, subtracting "1" from a value represented by the (2N–M)-th through the (X–1)-th bits of the dividend A to obtain a result as higher order bits of the quotient S (step 78); otherwise, selecting the (2N–M)-th through the (X–1)-th bits of the dividend A as higher order bits of the quotient S (step 80); and concatenating said higher order bits and said lower order bits to obtain the quotient S (step 82).

The above method can further include the steps of providing the quotient register 24, wherein: step 74 further includes the steps of storing the selected M-th through the (N–1)-th bits of the dividend A into the 0-th through the (N–M–1)-th bits of the quotient register 24, respectively; step 78 further includes the steps of storing the subtraction result into the (N–M)-th through the (2N–2M–3)-th bits of the quotient register 24; and step 80 further includes the steps of storing the selected (2N–M)-th through the (X–1)-th bits of the dividend A into the (N–M)-th through the (2N–2M–3)-th bits of the quotient register 24, respectively. The quotient S is represented by the 0-th through the (2N–2M–3)-th bits of the quotient register 24. Further, the dividend A can be initially stored in the dividend register 12 before step 74. The selected bits of the dividend register 12 and the bits of the subtraction result can be stored into the quotient register 24 in parallel.

In an alternative embodiment of the method of the present invention, the selected bits of the dividend register 12 and the bits of the subtraction result can be stored into the quotient register 24 by shifting. In that case, step 74 includes the steps of shifting the M-th through the (N–1)-th bits of the dividend A from the dividend register 12 into the 0-th through (N–M–1)-th bits of the quotient register 24, respectively. And, step 80 can include the steps of shifting the (2N–M)-th through the (X–1)-th bits of the dividend A in the dividend register 12 into the (N–M)-th through the (2N–2M–3)-th bits of the quotient register 24, respectively.

Step 78 can further include the steps of subtracting the value "1" from data represented by the (2N–M)-th through the (X–1)-th bits of the dividend A in the dividend register 12, and storing the result into the (N–M)-th through the (2N–2M–3)-th bits of the quotient register 24, respectively. And, the step of storing said result into the (N–M)-th through the (2N–2M–3)-th bits of the quotient register 24, respectively, can further include the steps of shifting said result into the (N–M)-th through the (2N–2M–3)-th bits of the quotient register 24, respectively. Alternatively, step 78 can include the steps of: (1) storing the (2N–M)-th through the (X–1)-th bits of the dividend in the dividend register 12 into 0-th through (N–M–1)-th bits of a temporary register, (2) subtracting the value "1" from the value in the temporary register to generate the result, and (3) shifting the 0-th through the (N–M–1)-th bits of the result into the (N–M)-th through the (2N–2M–3)-th bits of the quotient register 24, respectively.

Figure 8:
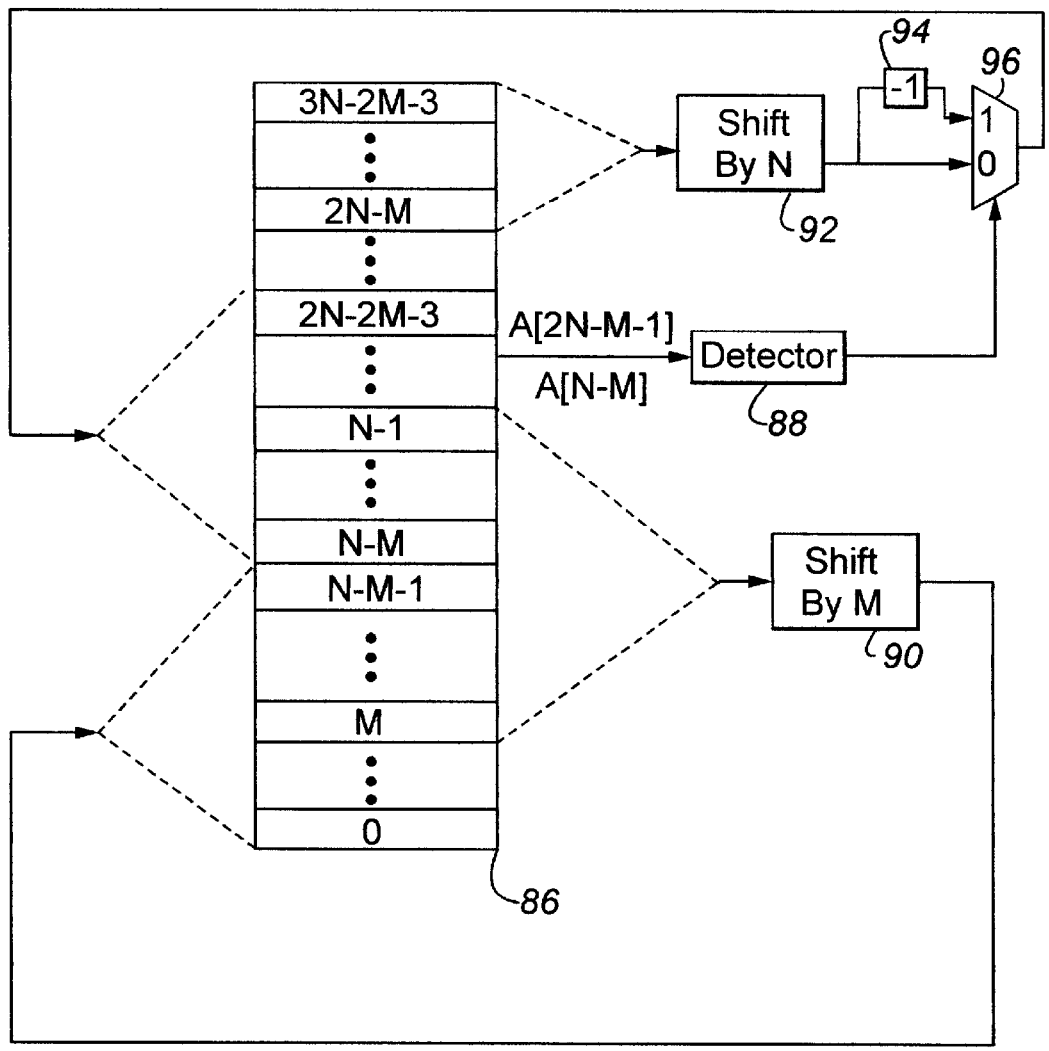
FIG. 8 shows an example block diagram of the architecture of an embodiment of another division circuit according to the present invention.

FIG. 8 shows an embodiment of a division circuit 84 according to another aspect of the present invention for calculating the quotient S from the dividend A and the divisor D, wherein the divisor D is represented as $(2^N+2^M)$ where N is greater than M. The dividend A is divisible by the divisor D without a remainder. The dividend A comprises an X-bit binary number including 0-th through (X−1)-th bits stored in a dividend shift register 86. A detector 88 detects the (N−1)-th and the (2N−M−1)-th bits of the dividend in the dividend shift register 86 and generates a control signal if: (1) the (N−1)-th bit of the dividend is "1" and (2) the (2N−M−1)-th bit of the dividend is "0".

A first control means 90 shifts the M-th through the (N−1)-th bits of the dividend in the dividend shift register 86 into the 0-th through the (N−M−1)-th bits of the dividend shift register 86, respectively. The first control means 90 can include a first signal generator for providing shift signals to the dividend register 86 and first electrical connection circuitry for transferring data from the M-th through the (N−1)-th bits of the register 86 to the 0-th through the (N−M−1)-th bits of the register 86. The first control means 90 effectively shifts the M-th through the (N−1)-th bits of the register 86 by M. A second control means 92 shifts out the (2N−M)-th through the (X−1)-th bits of the dividend in the dividend shift register 86. The value X can be equal to (3N−2M−2). The second control means 92 can include a second signal generator for providing shift signals to the dividend register 86 and second electrical connection circuitry for transfering data from the (2N−M)-th through the (X−1)-th bits of the register 86 to the (N−M)-th through the (2N−2M−3)-th bits of the register 86. The second control means 92 effectively shifts the (2N−M)-th through the (X−1)-th bits of the register 86 by N. The second control means 92 can further include internal registers for storing said shifted out bits and for providing said shifted out bits to a subtractor 94 and to a selector MUX 96.

The subtractor 94 subtracts the value "1" from said shifted out (2N−M)-th through the (X−1)-th bits of the dividend, to generate a subtraction result. The selector MUX 96 selects among said subtraction result bits and said shifted out bits, to be stored in the (N−M)-th through the (2N−2M−3)-th bits of dividend shift register 86 in response to the control signal from the detector 88. As such, in the presence of the control signal, the selector 96 stores said subtraction result bits in the (N−M)-th through the (2N−2M−3)-th bits of dividend shift register 86, otherwise in the absence of the control signal, the selector 96 stores said shifted out bits in the to the (N−M)-th through the (2N−2M−3)-th bits of dividend shift register 86. Whereby, the 0-th through the (2N−2M−3)-th bits of the dividend shift register represents the value of the quotient.

Figure 9:
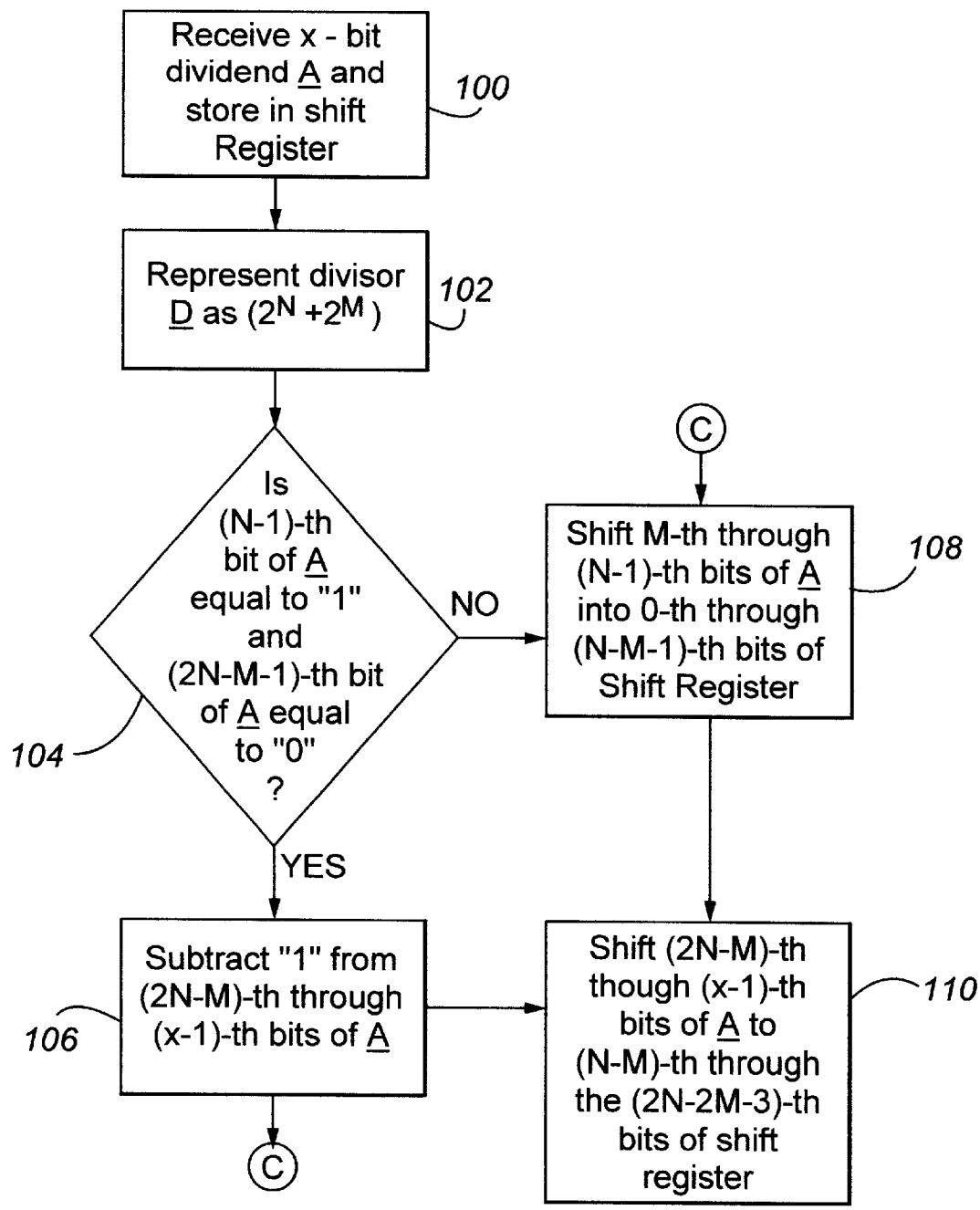
FIG. 9 shows an example flow chart of the steps of another embodiment of a division method according to the present invention.

FIG. 9 shows an example flowchart of another embodiment of a method for calculating the quotient S from the dividend A and the divisor D. The 0-th through the (X−1)-th bits of the dividend A are stored in a dividend shift register such as the shift register 86 (step 100). The values M and N are determined such that the divisor D is represented as $(2^N+2^M)$ (step 102). It is then determined if: (1) the (N−1)-th bit of the dividend is "1" and (2) the (2N−M−1)-th bit of the dividend is "0" (step 104). If so, the value "1" is subtracted from the (2N−M)-th through the (X−1)-th bits of the dividend (step 106). The M-th through the (N−1)-th bits of the dividend shift register are shifted into the 0-th through the (N−M−1)-th bits of the dividend shift register, respectively (step 108). And, the (2N−M)-th through the (X−1)-th bits of the dividend shift register are shifted into the (N−M)-th through the (2N−2M−3)-th bits of dividend shift register, respectively (step 110). Whereby, the 0-th through the (2N−2M−3)-th bits of the dividend shift register represents the value of the quotient. The step 100 can be optional in that the dividend A can be pre-stored in a shift register. Further, step 108 can be performed before or after steps 106 and 110.

The method of the present invention can be implemented as program instructions to be performed by a processor or to configure a logic circuit. The program instructions can be implemented in a high level programming language such as C, Pascal, etc. which is then compiled into object code and linked with object libraries as necessary to generate executable code for the processor. The program instructions can also be implemented in assembly language which is then assembled into object code and linked with object libraries as necessary to generate executable code.

Preferably, a logic circuit is configured by the program instructions to perform the steps described above. The logic circuit can be an Application Specific Integrated Circuit (ASIC). An ASIC is a device designed to perform a specific function as opposed to a device such as a microprocessor which can be programmed to performed a variety of functions. The circuitry for making the chip programmable is eliminated and only those logic functions needed for a particular application are incorporated. As a result, the ASIC has a lower unit cost and higher performance since the logic is implemented directly in a chip rather than using an instruction set requiring multiple clock cycles to execute. An ASIC is typically fabricated using CMOS technology with custom, standard cell, physical placement of logic (PPL), gate array, or field programmable gate array (FPGA) design methods. A dedicated logic circuit, such as an ASIC, provides higher performance than a microprocessor since the logic is implemented directly in the chip rather than using an instruction set requiring multiple clock cycles to be executed by a microprocessor. An ASIC implementing division methods and division circuits according to the present invention also substantially reduce the number of gates need for performing divisions.

Although the present invention has been described in considerable detail with regard to the preferred versions thereof, other versions are possible. Therefore, the appended claims should not be limited to the descriptions of the preferred versions contained herein.

What is claimed is:

1. A digital division circuit for calculating a quotient from a dividend and a divisor, wherein the divisor can be represented as $(2^N+2^M)$ where N is greater than M, and wherein the dividend comprises a binary number having X bits indexed as bits 0-th through (X−1)-th, the dividend being divisible by the divisor without a remainder, the digital division circuit comprising:

(a) a first circuit for providing the M-th through the (N−1)-th bits of the dividend as lower order bits of the quotient;

(b) a second circuit for providing the (2N−M)-th through the (X−1)-th bits of the dividend as a first higher order bit segment for the quotient;

(c) a detector for detecting the (N−1)-th and the (2N−M−1)-th bits of the dividend and for generating a control signal if: (1) the (N−1)-th bit of the dividend is "1" and (2) the (2N−M−1)-th bit of the dividend is "0";

(d) a subtractor connected to the second circuit for subtracting the value "1" from data including the (2N−M)-th through the (X−1)-th bits of the dividend and generating output bits as a second higher order bit segment for the quotient; and (e) a selector connected to the second circuit and to the subtractor, and responsive to the control signal from the detector for selecting between said first and second higher order bit segments as higher order bits of the quotient, wherein: (1) in the presence of the control signal the selector provides said second higher order bit segment as the higher order bits for the quotient, otherwise, (2) in the absence of the control signal the selector provides said first higher order bit segment as the higher order bits for the quotient;

wherein the higher and lower order bits represent a value of the quotient.

2. The digital division circuit of claim 1, wherein the subtractor is responsive to the control signal from the detector such that the subtractor performs the subtraction in the presence of the control signal.

3. The digital division circuit of claim 1 further comprising a quotient register for storing the quotient, the quotient register including at least (2N−2M−2) bits in length indexed as bits 0-th through (2N−2M−3)-th of the quotient register.

4. The digital division circuit of claim 3 further comprising a dividend register including at least X bits for storing the 0-th through the (X−1)-th bits of the dividend into the 0-th through the (X−1)-th bits of the dividend register, respectively.

5. The digital division circuit of claim 4 wherein the first circuit interconnects the dividend register to the quotient register for storing the M-th through the (N−1)-th bits of the dividend register into the 0-th through (N−M−1)-th bits of the quotient register, respectively, as the lower order bits of the quotient.

6. The digital division circuit of claim 5, wherein the selector comprises a multiplexer connected to: (i) the second circuit and the subtractor, and (ii) the quotient register, for storing said second higher order bit segment into the (N−M)-th through the (2N−2M−3)-th bits of the quotient register as the higher order bits of the quotient in response to the control signal from the detector, and for storing said first higher order bit segment into the (N−M)-th through the (2N−2M−3)-th bits of the quotient register, respectively, as the higher order bits of the quotient in the absence of the control signal from the detector;

wherein the quotient is represented by data including the 0-th through the (2N−2M−3)-th bits of the quotient register.

7. The digital division circuit of claim 6, wherein:

(i) the first circuit comprises first electrical connection means interconnecting the dividend register and the quotient register for storing the M-th through the (N−1)-th bits of the dividend register into the 0-th through (N−M−1)-th bits of the quotient register, respectively; and (ii) the second circuit comprises second electrical connection means interconnecting: (1) the dividend register, and (2) the subtractor and the multiplexer for providing the (2N−M)-th through the (X−1)-th bits of the dividend register to the subtractor and the multiplexer.

8. The digital division circuit of claim 1 wherein X is at most equal to the value (3N−2M−2).

9. A digital division circuit for calculating a quotient from a dividend and a divisor, wherein the divisor can be represented as $(2^N+2^M)$ where N is greater than M, and wherein the dividend comprises a binary number having X bits indexed as bits 0-th through (X−1)-th, the dividend being divisible by the divisor without a remainder, the digital division circuit comprising:

(a) a dividend shift register having a plurality of bits for storing the dividend;

(b) a detector for detecting the (N−1)-th and the (2N−M−1)-th bits of the dividend in the dividend shift register and for generating a control signal if: (1) the (N−1)-th bit of the dividend is "1" and (2) the (2N−M−1)-th bit of the dividend is "0";

(c) a first control circuit connected to the dividend shift register for shifting out the M-th through the (N−1)-th bits of the dividend from the dividend shift register as the 0-th through the (N−M−1)-th lower order bits of the quotient;

(d) a second control circuit connected to the dividend shift register for shifting out the (2N−M)-th through the (X−1)-th bits of the dividend from the dividend shift register as a first higher order bit segment of the quotient;

(e) a subtractor for subtracting the value "1" from said higher order bit segment to generate a second higher order bit segment of the quotient; and (f) a selector responsive to the control signal for selecting between said first and second higher order bit segments as (N−M)-th through the (2N−2M−3)-th higher order bits of the quotient, wherein: (1) in the presence of the control signal the selector provides said second higher order bit segment as the higher order bits for the quotient, otherwise, (2) in the absence of the control signal the selector provides said first higher order bit segment as the higher order bits for the quotient;

wherein said lower and higher order bits represent the quotient.

10. The digital division circuit of claim 9 further comprising:

(a) a quotient register including at least (2N−2M−2) bits in length; and (b) means for storing the 0-th through the (N−M−1)-th bits of the dividend shifted out from the dividend shift register into the 0-th through the (N−M−1)-th bits of the quotient register.

11. The digital division circuit of claim 10 further comprising a temporary shift register, wherein: (i) the second control circuit shifts out the (2N−M)-th through the (X−1)-th bits of the dividend from the dividend shift register into the 0-th through the (N−M−3)-th bits of the temporary shift register as said first higher order bit segment; and (ii) the subtractor subtracts the value "1" from the value in the temporary shift register to generate said second higher order bit segment.

12. The digital division circuit of claim 9 wherein X is at most equal to the value (3N−2M−2).

13. The digital division circuit of claim 12 wherein the dividend register includes at least X bits in length, and the 0-th through the (X−1)-th bits of the dividend are stored in the 0-th through the (X−1)-th bits of the dividend register, respectively.

14. The digital division circuit of claim 9 wherein the subtractor includes at least (M−N−2) input bits and at least (M−N−2) output bits.

15. A method of configuring a digital processing device having data registers, for calculating a quotient from a dividend and a divisor, wherein the divisor can be represented as $(2^N+2^M)$ where N is greater than M, and wherein the dividend comprises a binary number in a dividend register having X bits indexed as bits 0-th through (X−1)-th, the dividend being divisible by the divisor without a remainder, the method comprising the steps of:

(a) using a selector for selecting the M-th through the (N−1)-th bits of the dividend in the dividend register as lower order bits of the quotient;

(b) using a detector to determine if the (N−1)-th bit of the dividend is "1" and if the (2N−M−1)-th bit of the dividend is "0", and if so, then:

(1) using a subtractor for subtracting the value "1" from a value represented by the (2N−M)-th through the (X−1)-th bits of the dividend in the dividend register to obtain a result as higher order bits of the quotient; otherwise, (2) using a selector for selecting the (2N−M)-th through the (X−1)-th bits of the dividend in the dividend register as higher order bits of the quotient; and (c) using a concatenator for concatenating said higher order bits and said lower order bits to obtain the quotient in a quotient register.

16. The method of claim 15 wherein the quotient register includes a plurality of bits, wherein:

(i) step (a) further comprises the steps of storing said selected M-th through the (N−1)-th bits of the dividend into the 0-th through the (N−M−1)-th bits of the quotient register, respectively;

(ii) step (b)(1) further comprises the steps of storing said result into the (N−M)-th through the (2N−2M−3)-th bits of the quotient register; and (iii) step (b)(2) further comprises the steps of storing said selected (2N−M)-th through the (X−1)-th bits of the dividend into the (N−M)-th through the (2N−2M−3)-th bits of the quotient register, respectively;

wherein the quotient is represented by the 0-th through the (2N−2M−3)-th bits of the quotient register.

17. The method of claim 16 wherein the dividend register has at least X bits, and the 0-th through the (X−1)-th bits of the dividend are stored into the 0-th through the (X−1)-th bits of the dividend register, respectively.

18. The method of claim 17 wherein step (a) further comprises the steps of shifting the M-th through the (N−1)-th bits of the dividend register into the 0-th through (N−M−1)-th bits of the quotient register, respectively.

19. The method of claim 17 wherein step (b)(2) further comprises the steps of shifting the (2N−M)-th through the (X−1)-th bits of the dividend register into the (N−M)-th through the (2N−2M−3)-th bits of the quotient register, respectively.

20. The method of claim 17, wherein step (b)(1) further comprises the steps of subtracting the value "1" from data represented by the (2N−M)-th through the (X−1)-th bits of the dividend register, and storing the result into the (N−M)-th through the (2N−2M−3)-th bits of the quotient register, respectively.

21. The method of claim 20 wherein, the step of storing said result into the (N−M)-th through the (2N−2M−3)-th bits of the quotient register, respectively, comprises shifting said result into the (N−M)-th through the (2N−2M−3)-th bits of the quotient register, respectively.

22. The method of claim 17 wherein step (b)(1) further comprises the steps of: (i) storing the (2N−M)-th through the (X−1)-th bits of the dividend register into 0-th through (N−M−1)-th bits of a temporary register, (ii) subtracting the value "1" from the value in the temporary register, and (iii) storing the 0-th through the (N−M−1)-th bits of the temporary register into the (N−M)-th through the (2N−2M−3)-th bits of the quotient register, respectively.

23. The method of claim 16 wherein the quotient register includes at least (2N−2M−2) bits.

24. The method of claim 15 wherein N and M are greater than zero.

25. The method of claim 15 wherein X is at most equal to the value (3N−2M−2).

26. The method of claim 15 further comprising the steps of determining the values of N and M for the dividend before step (a), wherein the divisor is equal to the value ($2^N+2^M$).

27. A digital division circuit for calculating a quotient from a dividend and a divisor, wherein the divisor can be represented as ($2^N+2^M$) where N is greater than M, and wherein the dividend comprises a binary number having X bits indexed as bits 0-th through (X−1)-th, the dividend being divisible by the divisor without a remainder, the digital division circuit comprising:

(a) a dividend shift register having at least X bits, wherein the 0-th through the (X−1)-th bits of the dividend are stored in the 0-th through the (X−1)-th bits of the dividend shift register, respectively;

(b) a detector for detecting the (N−1)-th and the (2N−M−1)-th bits of the dividend in the dividend shift register and for generating a control signal if: (1) the (N−1)-th bit of the dividend is "1" and (2) the (2N−M−1)-th bit of the dividend is "0";

(c) a first control means for shifting the M-th through the (N−1)-th bits of the dividend in the dividend shift register into the 0-th through the (N−M−1)-th bits of the dividend shift register, respectively;

(d) a second control means for shifting out the (2N−M)-th through the (X−1)-th bits of the dividend in the dividend shift register;

(e) a subtractor for subtracting the value "1" from said shifted out (2N−M)-th through the (X−1)-th bits of the dividend to generate a result; and (f) a selector for selecting among said subtraction result bits and said shifted out bits, to be stored in the (N−M)-th through the (2N−2M−3)-th bits of dividend shift register in response to the control signal from the detector, wherein: (1) in the presence of the control signal the selector stores said subtraction result bits in the (N−M)-th through the (2N−2M−3)-th bits of dividend shift register, otherwise (2) in the absence of the control signal the selector stores said shifted out bits in the to the (N−M)-th through the (2N−2M−3)-th bits of dividend shift register;

whereby, the 0-th through the (2N−2M−3)-th bits of the dividend shift register represent the value of the quotient.

28. The digital division circuit of claim 27 wherein X is at most equal to the value (3N−2M−2).

29. The digital division circuit of claim 27 wherein the subtractor includes at least (M−N−2) input bits and at least (M−N−2) output bits.

30. A method of configuring a digital processing device having data registers, for calculating a quotient from a dividend and a divisor, wherein the divisor can be represented as ($2^N+2^M$) where N is greater than M, and wherein the dividend comprises a binary number having X bits indexed as bits 0-th through (X−1)-th, the dividend being divisible by the divisor without a remainder, the method comprising the steps of:

(a) storing the dividend in a dividend shift register having at least X bits, wherein the 0-th through the (X−1)-th bits of the dividend are stored in the 0-th through the (X−1)-th bits of the dividend shift register, respectively;

(b) using a detector for determining if: (1) the (N−1)-th bit of the dividend is "1" and (2) the (2N−M−1)-th bit of the dividend is "0", and if so, using a subtractor for subtracting the value "1" from the (2N−M)-th through the (X−1)-th bits of the dividend;

(c) using a shifter for shifting the M-th through the (N−1)-th bits of the dividend in the dividend shift register into the 0-th through the (N−M−1)-th bits of the dividend shift register, respectively; and (d) using a shifter for shifting the (2N−M)-th through the (X−1)-th bits of the dividend to the (N−M)-th through the (2N−2M−3)-th bits of dividend shift register, respectively;

whereby the 0-th through the (2N−2M−3)-th bits of the dividend shift register represent the value of the quotient.

31. The method of claim 30 wherein X is at most equal to the value (3N−2M−2).

* * * * *